(12) United States Patent
Kurokawa et al.

(10) Patent No.: US 6,394,220 B1
(45) Date of Patent: May 28, 2002

(54) ELECTRIC POWER STEERING DEVICE

(75) Inventors: Takanori Kurokawa, Kashiwara; Hirokazu Arai, Yamatokooriyama, both of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/670,473

(22) Filed: Sep. 26, 2000

(30) Foreign Application Priority Data

Oct. 6, 1999 (JP) .......................................... 11-285475

(51) Int. Cl.⁷ ................................................ B62D 5/04
(52) U.S. Cl. ........................... 180/444; 74/388; 74/425; 74/500; 74/DIG. 10; 428/66.1; 428/66.6
(58) Field of Search ................................. 180/444, 443; 74/425, 388, 500, DIG. 10; 428/66.1, 66.6

(56) References Cited

U.S. PATENT DOCUMENTS

| 4,777,204 A | * | 10/1988 | Ikenaga et al. | ............. 524/439 |
| H988 H | * | 11/1991 | Gergen et al. | ............... 525/179 |
| RE34,984 E | * | 6/1995 | Kitao et al. | ................... 525/420 |
| 5,738,183 A | * | 4/1998 | Nakajima et al. | ........... 180/444 |
| 6,012,349 A | * | 1/2000 | Kelley | .......................... 74/421 |
| 6,044,723 A | * | 4/2000 | Eda et al. | ............... 74/388 PS |
| 6,087,445 A | * | 7/2000 | Gherghel et al. | ........... 525/178 |
| 6,214,277 B1 | * | 4/2001 | Saigo et al. | ................. 264/443 |

FOREIGN PATENT DOCUMENTS

| JP | 355058251 A | * | 4/1980 |
| JP | 40821627 A | * | 8/1996 |

* cited by examiner

Primary Examiner—Brian L. Johnson
Assistant Examiner—Daniel Yeagley
(74) Attorney, Agent, or Firm—Jordan and Hamburg LLP

(57) ABSTRACT

An electric power steering device transmits rotation of an electric actuator for generating auxiliary steering power to a wheel via a worm and a worm wheel. The worm wheel is molded from pelletized synthetic resin material. A number average molecular weight of the pelletized synthetic resin material is greater than or equal to 30,000 and less than or equal to 60,000.

4 Claims, 3 Drawing Sheets

ELECTRIC POWER STEERING DEVICE

FIELD OF THE INVENTION

The present invention relates to an electric power steering device which transmits rotation of an electric actuator for generating auxiliary steering power to wheels via a worm and a worm wheel.

DESCRIPTION OF THE RELATED ART

In light automobiles and small-sized automobiles, an electric power steering device is used which transmits the rotation of an electric actuator for generating auxiliary steering power to wheels via a worm and a worm wheel, and the worm wheel is formed from a synthetic resin material so that the worm wheel can be made lighter-weight and less noise is generated.

In recent years, better fuel economy has come to be demanded of vehicles in an attempt to address environmental problems. Thus, in electric power steering devices used in large automobiles as well, there has been the demand to form the worm wheel thereof from a synthetic resin material. To this end, because a higher output is required from the electric actuator than in light automobiles, the strength of the dedenda of the worm wheel, which reduces the speed of rotation of the electric actuator, must be improved.

However, a conventional worm wheel formed from a synthetic resin material lacks a sufficient dedendum strength which can withstand the high output of the electric actuator.

An object of the present invention is to provide an electric power steering device which can overcome the above-described drawbacks.

SUMMARY OF THE INVENTION

The present invention is an electric power steering device which transmits rotation of an electric actuator for generating auxiliary steering power to a wheel via a worm and a worm wheel which meshes with the worm, wherein the worm wheel is molded from pelletized synthetic resin material, and a number average molecular weight of the pelletized synthetic resin material is greater than or equal to 30,000 and less than or equal to 60,000.

In accordance with the structure of the present invention, the worm wheel, which transmits the rotation of the electric actuator, is molded from pelletized synthetic resin material. In this way, the worm wheel can be made light-weight and less noise is generated. Further, because the number average molecular weight of the pelletized synthetic resin material is at least 30,000, the dedendum strength of the worm wheel can be improved, and because the number average molecular weight is no more than 60,000, the moldability can be ensured.

The present invention is based on the following discovery.

In accordance with general theoretical computation formulae applied to gears formed from metal materials, the dedendum strength of the gear is correlated to the tensile strength and the bending strength of the gear material. However, when a worm wheel is formed from synthetic resin material, the dedendum strength is not correlated with the tensile strength and the bending strength of the material. In actuality, when reinforcing fibers are filled in the synthetic resin material in order to improve the tensile strength and the bending strength, the dedendum strength is lower than in a case in which reinforcing fibers are not filled in the synthetic resin material. This is because the dedendum strength of a worm wheel formed from a synthetic resin material is determined by the balance between the buffering of the surface pressure applied to the tooth based on the elasticity of the resin material and the strength of the synthetic resin material. The present invention was arrived at on the basis of the discovery that the dedendum strength can be improved by increasing the viscosity of the synthetic resin material. The viscosity of synthetic resin material increases due to an increase in the number average molecular weight thereof. Thus, by increasing the number average molecular weight of from 15,000 to 20,000 or less of the pelletized synthetic resin materials used as material of conventional worm wheels, by 1.5 to 2 or more times to a value of 30,000 or more, the viscosity can be made greater and the dedendum strength of the worm wheel can be made greater than those of conventional worm wheels. Further, the moldability can be ensured due to the number average molecular weight being 60,000 or less.

It is preferable that the worm wheel is formed through an injection molding process, and that the gate of the mold for the injection molding is a film gate. In this way, even if the melt viscosity of the molten material injected in the cavity of the mold is high because the number average molecular weight of the pelletized synthetic resin material is high, the material can be filled uniformly within the cavity, and a deterioration in moldability can be prevented.

It is preferable that the synthetic resin is nylon resin. The initial strength of a high-viscosity nylon, which has a high number average molecular weight, is great. Thus, a lowering of the strength due to absorption of moisture or heat deterioration can be prevented. Further, even if the number average molecular weight of the nylon synthetic resin material is high, the moldability is excellent and the material has a long life.

It is preferable that the worm wheel is injection molded from the pelletized synthetic resin material. The molding costs can be reduced by injection molding.

It is preferable that the pelletized synthetic resin material is pure material. In this way, wear of the worm which meshes with the worm wheel can be prevented.

Reinforcing fibers can be filled in the pelletized synthetic resin material. By filling reinforcing fibers in the material, a change in the dimensions due to moisture absorption or heating can be prevented, and the dimensional stability can be improved.

The present invention provides an electric power steering device in which the strength of a worm wheel, which is made of synthetic resin material and which transmits rotation of an electric actuator for generating auxiliary steering power, can be improved, the output of the electric actuator can be made to be a high output, the worm wheel can be made compact, thus requiring less space, a lowering of the strength due to absorption of moisture or heat deterioration can be prevented, and the worm wheel can be made to have a long life.

DESCRIPTION OF THE PREFERRED EMBODIMENT

An embodiment of the present invention is described hereinafter with reference to the drawings.

Figure 1:
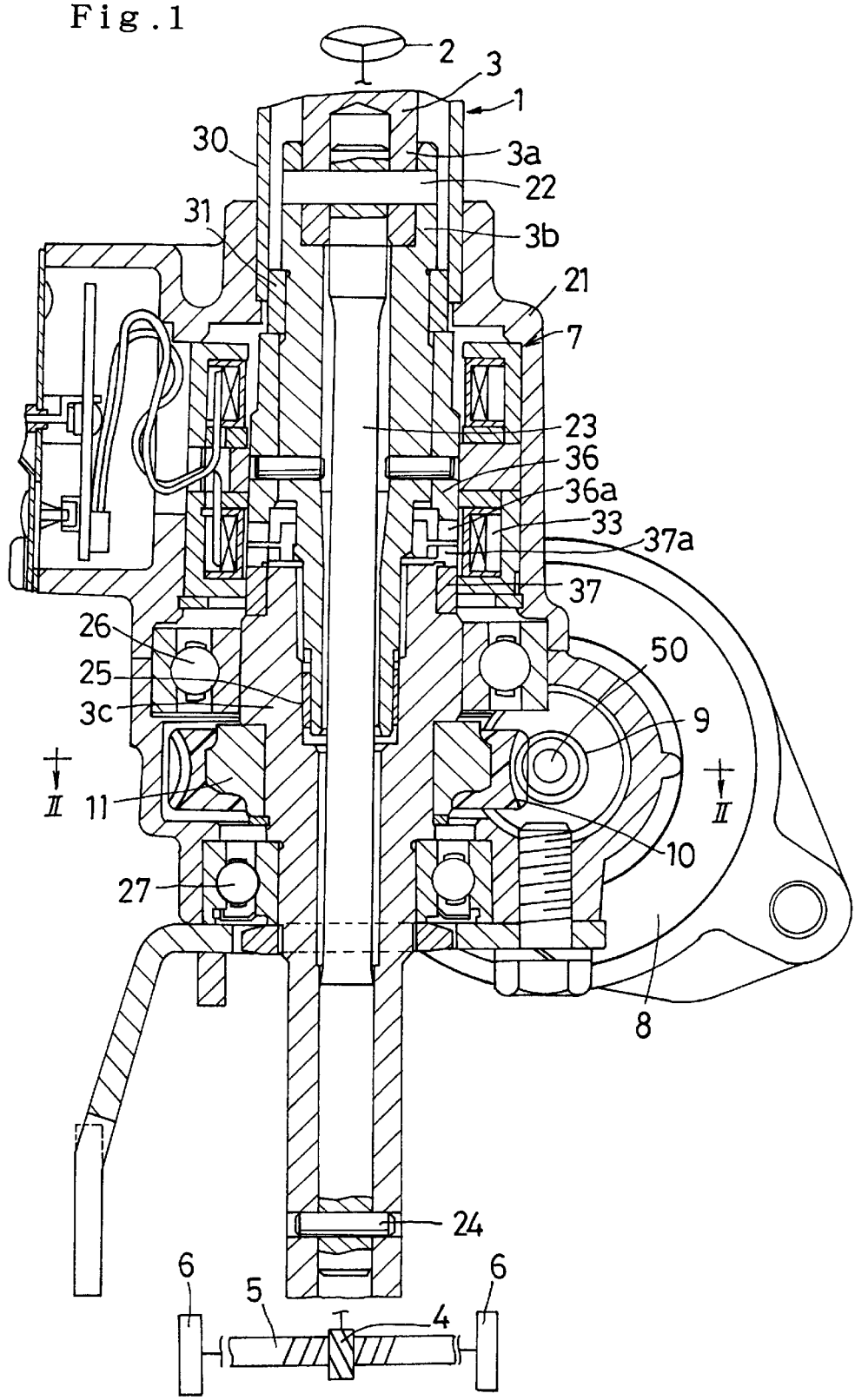
FIG. 1 is a cross-sectional view of an electric power steering device of an embodiment of the present invention.

An electric power steering device 1 illustrated in FIG. 1 transmits steering torque, which is generated by the operation of a steering wheel 2, to a pinion 4 through a steering shaft 3. In this way, the electric power steering device 1 varies the steering angle by moving a rack 5 which meshes with the pinion 4, such that the movement of the rack 5 is transmitted to wheels 6 via tie rods, knuckle arms, etc. (not shown in figures).

Figure 2:
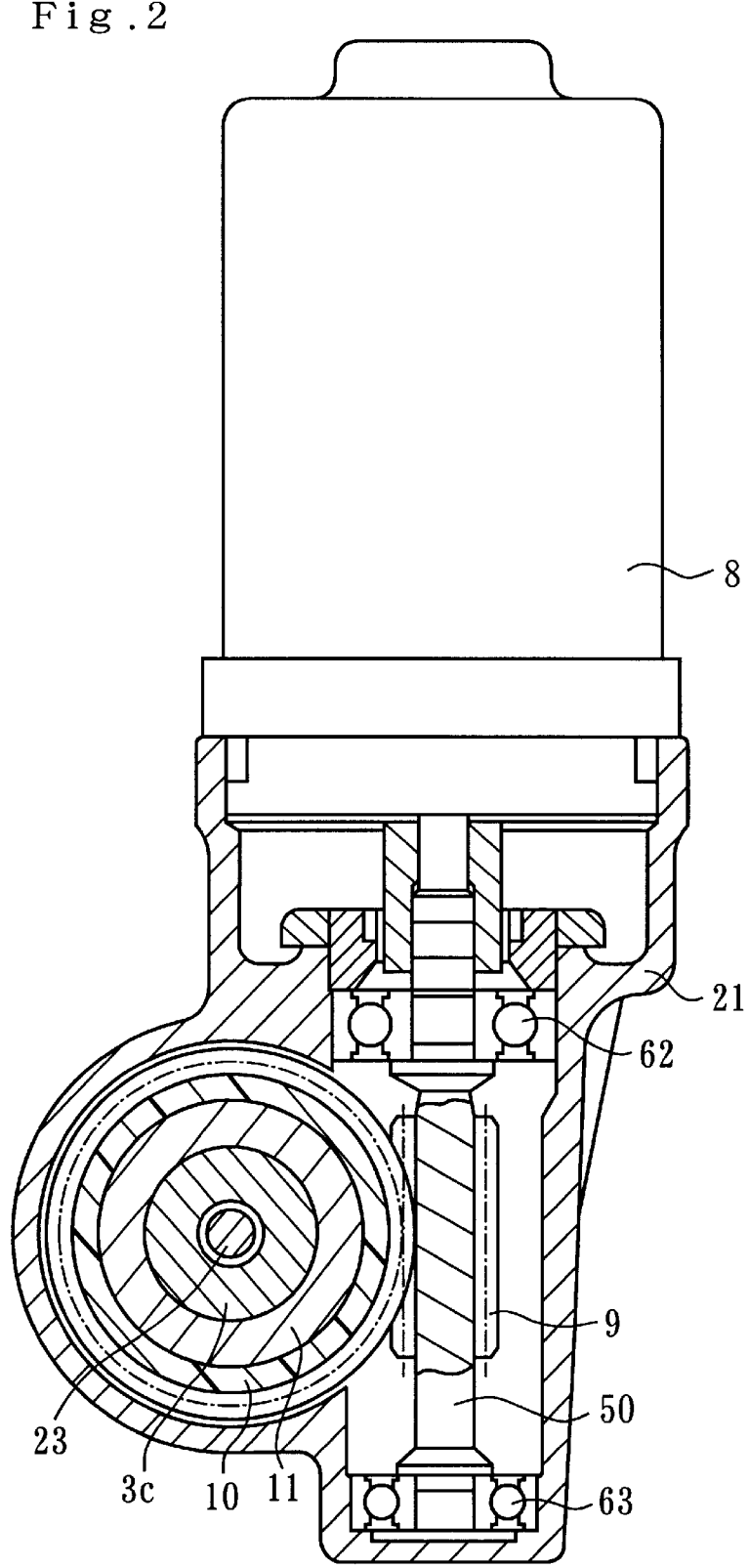
FIG. 2 is a sectional view taken along line II—II of FIG. 1.
Figure 3:
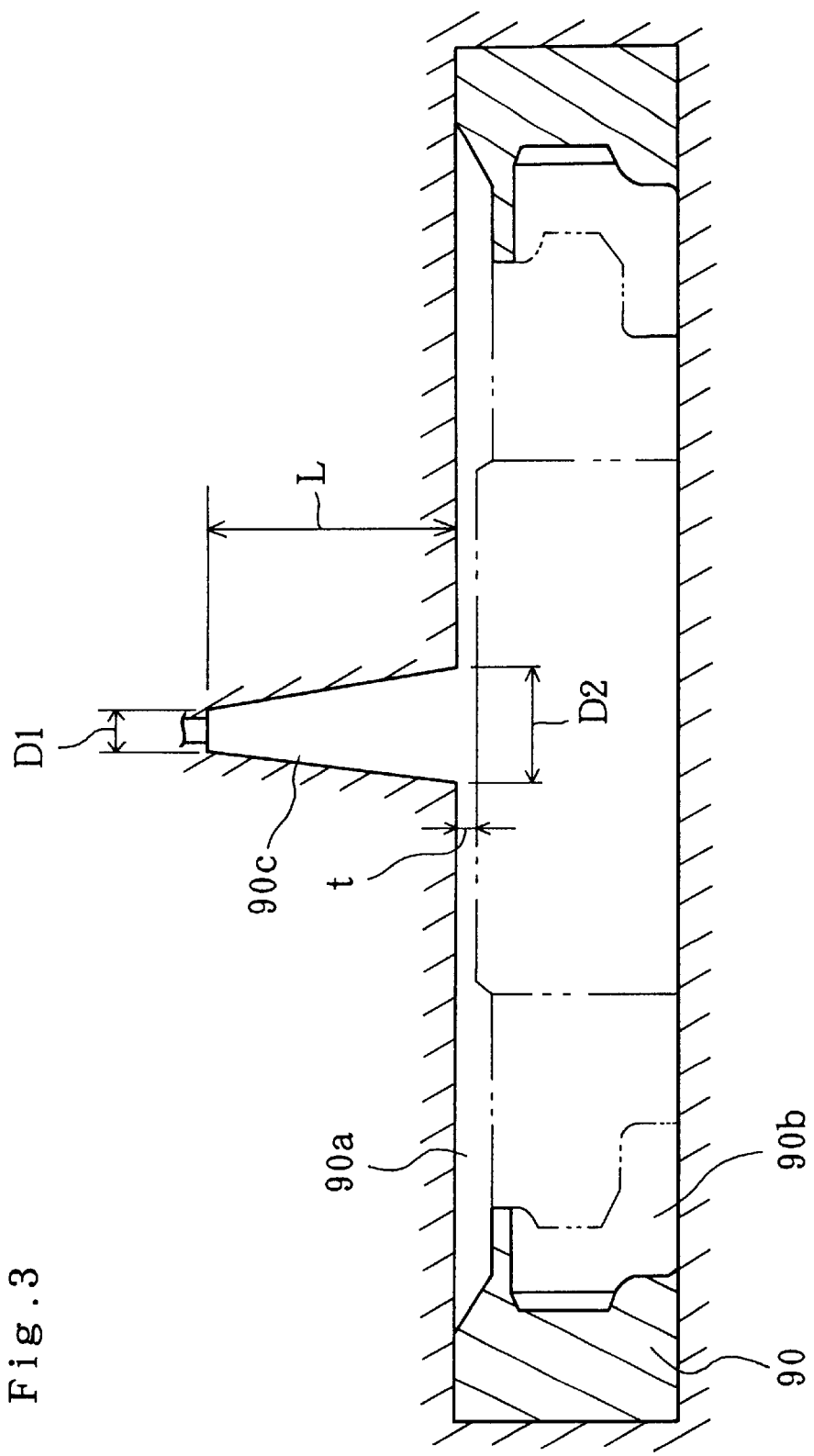
FIG. 3 is a schematic view for explanation of a mold of a worm wheel of the embodiment of the present invention.

A torque sensor 7, a motor (electric actuator) 8, a metal worm 9, and a worm wheel 10 are provided in order to provide an auxiliary steering power which corresponds to the steering torque transmitted by the steering shaft 3. The torque sensor 7 detects the steering torque. The motor 8 is driven in accordance with the detected steering torque. The metal worm 9 is provided at the outer circumference of a drive shaft 50 which is driven by the motor 8. The worm wheel 10 is mounted to the steering shaft 3 and meshes with the worm 9. Auxiliary steering power can be provided due to the rotation of the motor 8 being transmitted to the wheels 6 from the steering shaft 3 via the worm 9 and the worm wheel 10. As illustrated in FIG. 2, the drive shaft 50, which is driven by the motor 8 mounted to a housing 21, is supported by the housing 21 via bearings 62, 63.

The steering shaft 3 is divided into a first shaft 3a, a second shaft 3b, and a third shaft 3c. The first shaft 3a is connected to the steering wheel 2. The second shaft 3b is tubular and is connected to the first shaft 3a by a pin 22. The third shaft 3c is tubular and fitted to the outer periphery of the second shaft 3b via a bushing 25 so as to be able to rotate relatively to the second shaft 3b. A torsion bar 23, which serves as an elastic member, is inserted into the first shaft 3a, the second shaft 3b and the third shaft 3c along the centers thereof. One end of the torsion bar 23 is connected to the first shaft 3a and the second shaft 3b by the pin 22. The other end of the torsion bar 23 is connected to the third shaft 3c. In this way, the second shaft 3b and the third shaft 3c are able to rotate relative to each other elastically in accordance with the steering torque.

The second shaft 3b is supported, via a bushing 31, by a steering column 30 which is press-fit into the housing 21. The third shaft 3c is supported by the housing 21 via bearings 26, 27. The worm wheel 10 is formed integrally with the outer periphery of a metal sleeve 11 which is fit on the outer periphery of the third shaft 3c. The sleeve 11 can be fixed to the third shaft 3c by press-fitting or via a key or the like. Or, a torque limiter mechanism can be provided between the sleeve 11 and the third shaft 3c such that, when a large torque is applied, the worm wheel 10 and the steering shaft 3 rotate relative to each other.

The torque sensor 7 has a first detection ring 36, a second detection ring 37, and a detection coil 33. The first detection ring 36 is formed from a magnetic material and is fixed to the second shaft 3b. The second detection ring 37 is formed from a magnetic material and is fixed to the third shaft 3c. The detection coil 33 covers the space between the detection rings 36 and 37. A plurality of teeth 36a are provided along a circumferential direction at an end surface of the first detection ring 36, and a plurality of teeth 37a, which opposes to the teeth 36a, are provided along the circumferential direction at an end surface of the second detection ring 37. The opposing surface areas of the teeth 36a and 37a change in accordance with the elastic relative rotation between the second shaft 3b and the third shaft 3c, which rotation corresponds to the steering torque. The magnetic resistance to the magnetic flux generated by the detection coil 33 varies in accordance with the change in the opposing surface areas of the teeth 36a and 37a. Thus, the steering torque can be detected on the basis of the output of the detection coil 33. A torque sensor having a known structure can be used for the torque sensor 7. The motor 8 is driven in accordance with signals which correspond to the detected steering torque, and the rotation of the motor 8 is transmitted to the steering shaft 3 via the worm 9 and the worm wheel 10.

The worm wheel 10, which is a speed reducing gear of the rotation of the motor 8, is injection molded from pelletized synthetic resin material. The number average molecular weight of the pelletized synthetic resin material is greater than or equal to 30,000 and less than or equal to 60,000. In the present embodiment, the synthetic resin is nylon resin such as PA (polyamide) 6, PA66, PA46, PA12, PA11, PPA (polyparabanic acid) 11, PA6T, PA6·6T, and the like. Also, the pelletized synthetic resin material is pure material into which nothing has been filled.

When the number average molecular weight of the pelletized synthetic resin material is too large, the melt viscosity of the molten material being injected into the cavity of the mold at the time of injection molding is high, and the moldability deteriorates. Thus, in the present invention, a gate 90a of a mold 90 of the worm wheel 10 is a film gate. In this way, even if the melt viscosity of the injected material is high due to the number average molecular weight of the pelletized synthetic resin material being high, the material can be uniformly filled into a cavity 90b. In order to uniformly fill the material into the cavity 90b, a thickness t of the gate 90a is preferably 2.5 mm or more. A smaller length L of a runner 90c is preferable, but because the rigidity of the mold is required, the length L is preferably greater than or equal to 40 mm and less than or equal to 50 mm. An inlet diameter D1 of the runner 90c is made to be 4 mm or more in order to reduce the flow resistance of the material, and is preferably 6 mm or less in order to reduce resistance caused by the step between the inlet and the material extruding nozzle (which usually has a diameter of 3 mm). An outlet diameter D2 of the runner 90c is made to be 13 mm or more in order to reduce the flow resistance of the material, and the maximum diameter can be equal to the diameter of the gate 90a.

In the present embodiment, the worm wheel 10 and the sleeve 11 are formed integrally by carrying out injection molding in a state in which the sleeve 11 is inserted in the mold 90. After the molding, removal of the material filled at the gate 90a or the runner 90c, finishing of the teeth of the worm wheel 10, etc. are carried out by machining.

In accordance with the above-described structure, by forming the worm wheel 10, which transmits rotation of the motor 8, from the pelletized synthetic resin material, a lighter-weight structure and lower noise can be achieved. Further, due to the pelletized synthetic resin material having a number average molecular weight of 30,000 or more, the strength of the dedenda of the worm wheel 10 can be improved, and due to the number average molecular weight being no more than 60,000, the moldability can be ensured. Because the synthetic resin is nylon, the initial strength is high, and deterioration in strength due to absorption of moisture or heat deterioration can be prevented with excellent moldability and long life. By injection molding the worm wheel 10 from the pelletized synthetic resin material, the molding costs can be reduced. Because the synthetic resin material is pure, wear of the worm 9 can be prevented.

The present invention is not limited to the above-described embodiment. For example, the material of the worm wheel can be, other than nylon resin, thermoplastic synthetic resin such as PPS (polyphenylene sulfide), PES (polyether sulfone), POM (polyacetal) or the like. Further, reinforcing fibers can be filled in the synthetic resin material of the worm wheel. By filling reinforcing fibers into the pelletized synthetic resin material, change in the dimensions due to the absorption of moisture or heating can be prevented, such that the dimensional stability can be improved. Potassium titanate whiskers or aramide fibers or the like are preferably used as the reinforcing fibers in view of preventing wear of the worm which meshes with the worm wheel.

A test of the dedendum strength of the worm wheel and a durability test of the worm wheel were carried out by using, as an Example, a structure in which, in the electric power steering device having the structure of the above-described embodiment, the worm wheel was injection molded from pelletized pure PA-66 having a number average molecular weight of approximately 60,000, and by using, as a Comparative Example, an electric power steering device structured the same as that of the Example except that the worm wheel was injection molded from pelletized pure PA-66 having a number average molecular weight of approximately 20,000.

In the dedendum strength test, torque was applied to the worm in a state in which the worm wheel was locked. The torque which was applied to the worm at the time that the tooth of the worm wheel broke was measured as the dedendum strength of the worm wheel. The results showed that, in the Comparative Example, the dedendum strength was 11 N·m, and in the Example, the dedendum strength was 23 N·m.

Further, in the durability test, in a state in which a given load was applied from the wheel side, the steering wheel was reciprocally rotated a given number of times over a given rotational angle. The amount of backlash between a tooth of the worm and a tooth of the worm wheel, which corresponded to the amount of wear of the tooth of the worm wheel, was measured. The results showed that the amount of wear in the worm wheel of the Example was 68.3% of the amount of wear in the worm wheel of the Comparative Example.

Namely, it can be confirmed that, in accordance with the present invention, an improvement in the strength and in the life of the worm wheel made of synthetic resin can be obtained.

What is claimed is:

1. An electric power steering device for transmitting steering power to a wheel comprising:
   an electric actuator;
   a worm driven by said electric actuator;
   a worm wheel engaged with said worm for transferring steering force from said electric actuator to the wheel, the worm wheel being formed of nylon resin having an average molecular weight greater than or equal to 30,000 and less than or equal to 60,000.

2. The electric power steering device according to claim 1 wherein the nylon resin is pure nylon resin.

3. The electric power steering device according to claim 2 wherein the worm wheel is molded from pelletized nylon resin using a mold having a film gate.

4. The electric power steering device according to claim 1 wherein the worm wheel is molded from pelletized nylon resin using a mold having a film gate.

* * * * *